Jan. 3, 1933.  W. A. MURRAY, SR., ET AL  1,893,098
SPRING SEAT
Filed March 22, 1930  2 Sheets-Sheet 1
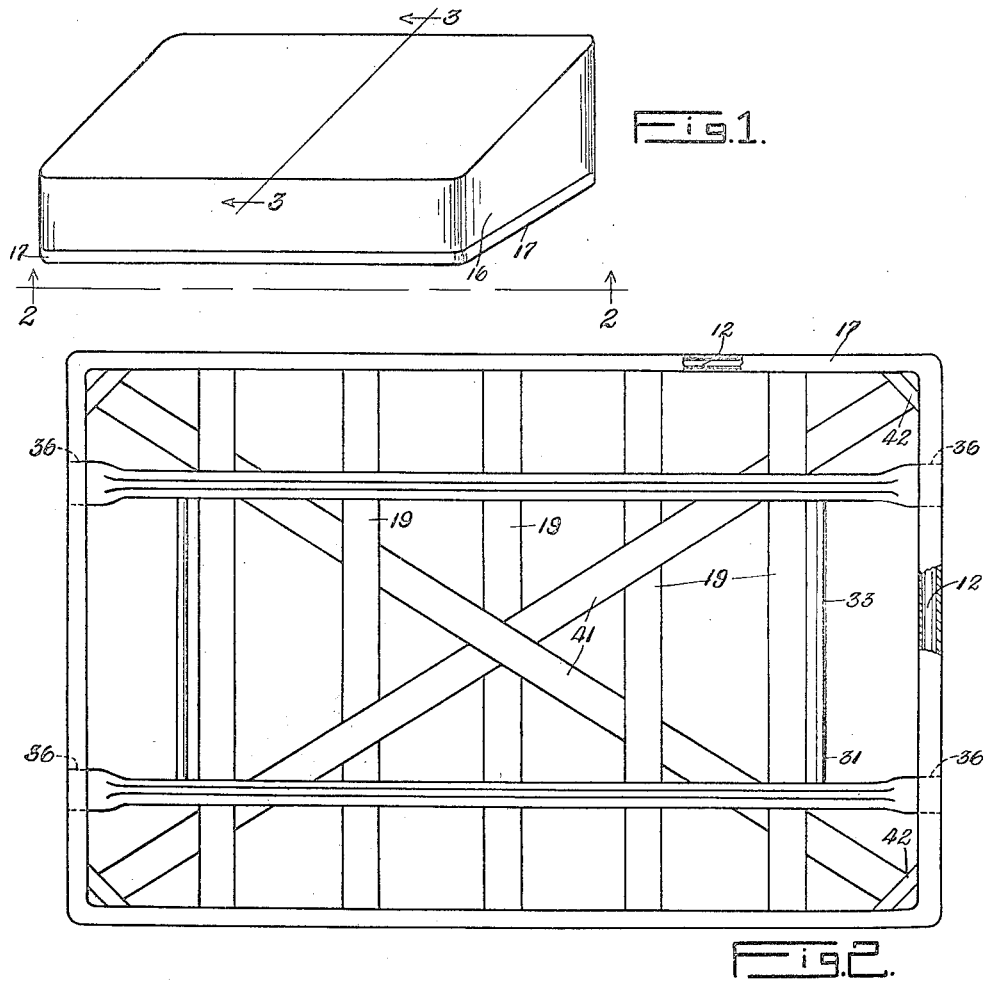
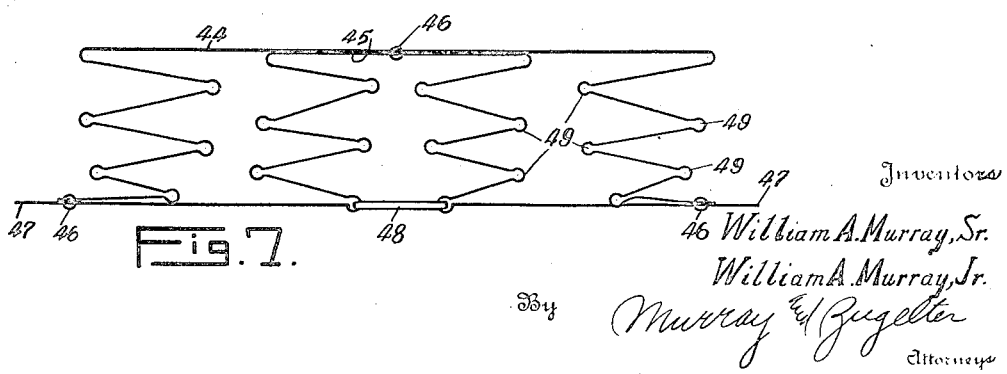
Inventors
William A. Murray, Sr.
William A. Murray, Jr.
By Murray & Gugelter
Attorneys

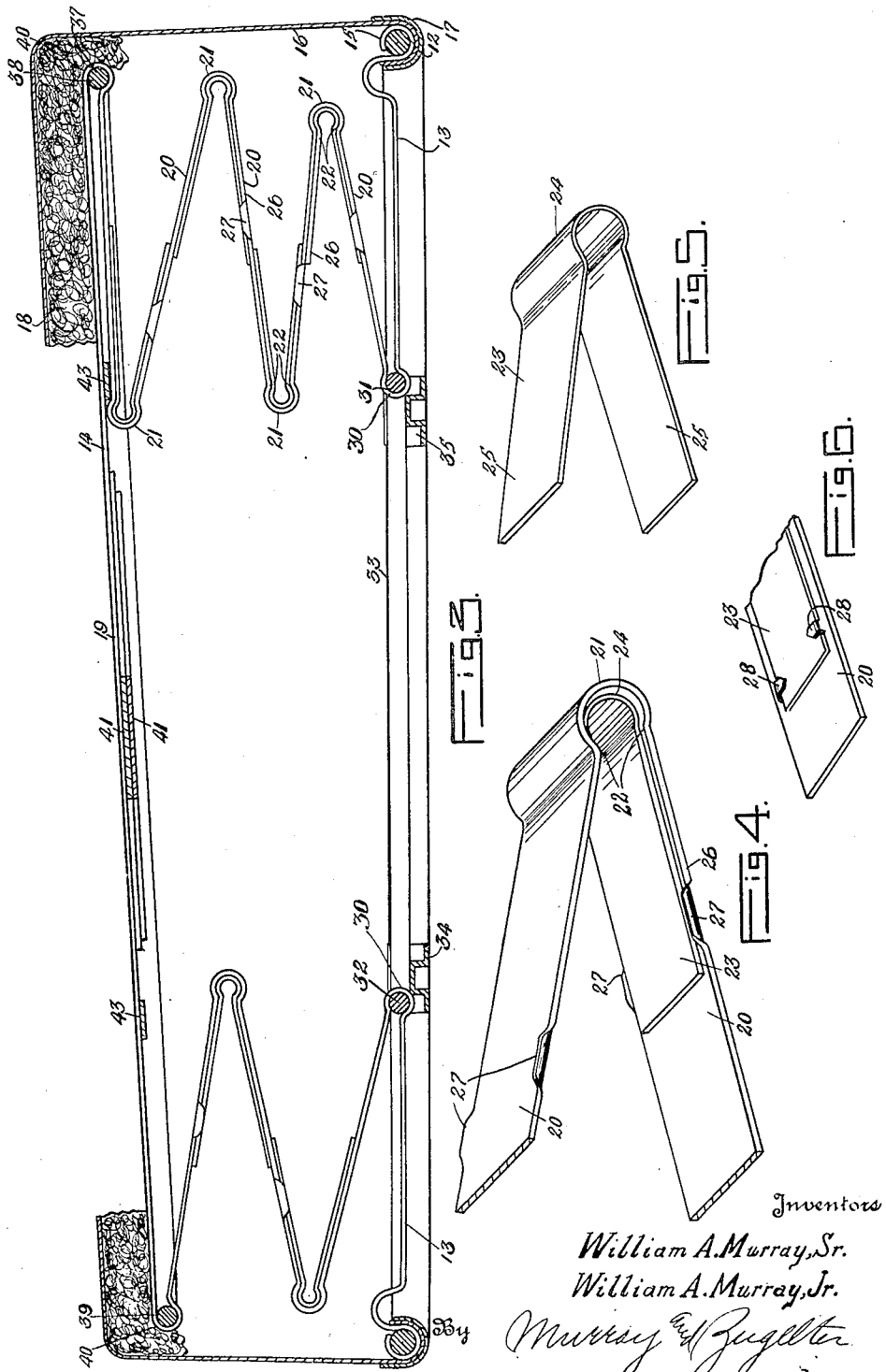

Patented Jan. 3, 1933

1,893,098

UNITED STATES PATENT OFFICE

WILLIAM A. MURRAY, SR., AND WILLIAM A. MURRAY, JR., OF CINCINNATI, OHIO, ASSIGNORS TO THE WILLIAM A. MURRAY SPRING COMPANY, OF CINCINNATI, OHIO, A CORPORATION OF OHIO

SPRING SEAT

Application filed March 22, 1930. Serial No. 438,045.

This invention relates to improvements in vehicle and furniture seats constructed with strip metal springs in lieu of the usual coiled wire springs.

An object of the invention is to provide a seat of the above type, the springs of which are formed of malleable metal strips which may readily be worked and bent to the desired shape and having resiliency imparted thereto by separate spring steel members attached thereto.

Another object of the invention, is to provide a seat of the above type, in which the separate spring steel members may readily be replaced by new members in the event of breakage.

Another object is to provide a spring seat of the foregoing type, the manufacturing cost of which is greatly reduced by reason of the use of malleable strip metal, which is worked or formed with great ease.

Another object is to provide simple means for maintaining the spring steel members in position within the seat spring.

These and other objects are attained by the means described herein and disclosed in the accompanying drawings, in which:

Fig. 1 is a perspective view of a seat constructed in accordance with the invention.

Fig. 2 is a bottom view of the seat taken on line 2—2 of Fig. 1.

Fig. 3 is an enlarged cross sectional view taken on line 3—3 of Fig. 1, parts being broken away.

Fig. 4 is an enlarged detail view showing the spring steel member in position upon the strip metal skeleton of the spring.

Fig. 5 is an enlarged detail view showing in perspective one of the spring steel members.

Fig. 6 is a partial perspective view showing one method of maintaining the spring steel member in position upon the skeleton of the spring.

Fig. 7 is a diagrammatical view showing a spring skeleton of the invention, suitable for use on a bed or sofa, the spring steel members being removed therefrom.

The spring seat of the present invention comprises a preferably rectangular lower frame member 12 of rod or bar stock, which supports at opposite sides thereof the lower supporting arms 13 of the individual skeleton frames 14. A plurality of such skeleton frames usually are disposed in spaced parallel relation transversely of the seat, as indicated by Fig. 2. Each of the arms 13 has a free end 15 which is clamped around the lower frame member 12 for permanent attachment thereto. The cloth, leather or other suitable covering material 16 is drawn about the member 12 and ends 15, and is secured in position by a channel shaped clamp strip 17 which extends about the periphery of the seat along the lower portion. Padding 18, which rests upon the connecting members 19 of each skeleton frame, is held in position by the covering material 16 as indicated in Fig. 3.

Each skeleton frame 14 consists of a connecting member or cushion support 19 which has its opposite ends developed into a series of leaves 20 folded upon one another or arranged in zig-zag fashion relative to one another, the supporting arm 13 of each series of leaves being also one of the leaves. The leaves diverge from the bends 21, the bends being socket shaped and having a constricted portion 22 which serves to hold the resilient spring steel members 23 in position between the divergent leaves or arms. The bends 21 are in the form of part of a cylinder, and the corresponding bends 24 of the resilient members 23 are adapted to seat therein, the divergent spring arms 25 thereof being disposed in abutment with the adjacent leaves of the skeleton frames. The resilient spring steel members serve to yieldingly resist bending and also converging of the arms when subjected to compressive force.

From the foregoing it will be readily understood that the peculiar shape of the bends and the provision of the projections or abutments 22, preclude longitudinal displacement of the resilient members 23. To preclude lateral displacement thereof relative to the leaves 20, the side edges 26 of the leaves may be mutilated to provide lugs 27 extending beyond the spring abutting surfaces of the leaves, and against which the resilient members may abut. In Fig. 6 is shown a pair of lugs 28 which accomplish the above purpose, the lugs being struck inwardly and bent upon the resilient member 23.

The forming of lugs such as 27 and 28, and also the bending of the skeleton frame to provide the zig-zagged leaves 20, are accomplished with great ease because of the fact that the entire skeleton frame is of a malleable metal, for example, low carbon steel. It is not necessary to carefully temper the metal of the skeleton frame. The tempering of the comparatively small members 23 may be easily and perfectly accomplished because of their small size, uniformity of thickness, and simplicity of form. In the event of breakage, the simple and inexpensive spring members may readily be replaced by new ones. The spring members preferably are of high point carbon steel, suitably tempered.

The innermost bend 30 of each support arm 13 is adapted to receive therein opposite sides 31 and 32 of a secondary frame consisting of a continuous rectangular loop 33 of rod or bar stock. This secondary frame is arranged to rest upon a pair of rails 34 and 35 extending transversely of the skeleton frames, each of which has ends 36 clamped upon or otherwise secured to the lower or primary frame member 12. The rails are channel shaped for purposes of strength. It is to be understood that the rails may extend parallel to the planes of the skeleton frames, if desired, and that any number of them may be employed to support the secondary frame and the leaves attached thereto.

The several skeleton frames are maintained in spaced relation at their top portions by means of a top loop 37 similar to, but larger than, loop 33. This loop has its opposite sides 38 and 39 passing through the partly closed bends 40 formed at the junction of the leaf portions and the cushion supporting straps 19, and said bends are pressure clamped upon the loop sides. The cushion supporting portion of the seat may be reinforced by means of cross straps 41 the opposite ends of which may be secured to the top loop 37, or to angle members 42 thereon, by any suitable means such as welding or crimping. It will be noted that the cross straps are interwoven with the cushion supporting members 19. Longitudinal stop or limiting straps 43 are provided transversely of the cushion supports and directly above the leaves 20 for the purpose of precluding distortion of the cushion supports when weight is applied thereon.

In Fig. 7 is shown a skeleton frame, with resilient members removed, which is suitable for use on a bed, sofa or long seat. In this construction, which is of two parts, 44 and 45, fastened together by rivets or the like 46, the attaching ends 47 are adapted to be fixed to a suitable rigid frame (not shown). The loop 48, which corresponds to loop 33 of the structure shown in Fig. 3, precludes sagging of the spring when in use. All of the bends 49, it will be understood, are to be supplied with resilient spring members 23 in accordance with the foregoing description.

It will be readily observed that springs constructed in accordance with the present invention will be capable of very inexpensive manufacture, for the strip metal used throughout the device is inexpensive and may readily be formed by the use of ordinary stamping machinery. The use of the individual resilient spring members 23 insures more uniform spring resiliency, for such members may accurately be tempered and at a minimum of cost. Also, the likelihood of springs becoming loose and piercing the covering material is eliminated. Because of fewer parts to be assembled, the spring seat of the present invention may be more inexpensively manufactured than seats provided with coil springs, and is subject to less breakage.

It is to be understood that various modifications and changes in structural details of the device may be made, within the scope of the appended claims, without departing from the spirit of the invention.

What is claimed is:

1. As a new article of manufacture a spring seat having in combination a supporting frame, a substantially non-resilient skeleton frame of malleable low carbon content metal secured to the supporting frame, said skeleton frame comprising a cushion supporting portion and leaf portions, the leaf portions consisting of folds disposed in zig-zag relation, resilient members between the folds for urging the folds apart, and cooperative means on the resilient members and the skeleton frame for precluding lateral and longitudinal movement of the resilient members relative to the skeleton frame.

2. As a new article of manufacture a spring seat having in combination a supporting frame, a substantially non-resilient cushion supporting member of malleable low carbon content metal which may readily be shaped, said cushion supporting member having ends developed into leaves folded upon one another, resilient members inserted between the leaves, and means for attaching the leaf portions of the cushion supporting member to the supporting frame.

3. As a new article of manufacture a spring seat having in combination a supporting frame, a skeleton frame secured to the supporting frame, said skeleton frame comprising a cushion supporting portion and leaf portions, the leaf portions consisting of substantially non-resilient folds, and individual resilient members having ends in overlapping relation that urge the folds apart.

4. As a new article of manufacture a spring seat having in combination a supporting frame having opposite sides, a cushion supporting member having opposite ends developed into substantially non-resilient bendable leaves arranged in zig-zag formation and secured to said opposite sides of the frame, and individual resilient members cooperating with the leaves and having resilient arms cooperatively arranged to preclude permanent bending of the leaves when subjected to compressive force.

5. As a new article of manufacture a spring seat having in combination a supporting frame, a skeleton frame secured to the supporting frame and comprising flat leaf portions having vertically aligned folds of unequal length disposed in zig-zag relation and having cylindrical bends at the ends thereof, and inequality in the length of the folds serving as a means to offset adjacent cylindrical bends and thereby preclude contact thereof one upon the other when the folds are compressed.

6. As a new article of manufacture a spring seat having in combination a supporting frame, a skeleton frame secured to the supporting frame and comprising flat leaf portions consisting of vertically aligned folds of unequal length disposed in zig-zag relation and having cylindrical bends at the ends thereof, the inequality in the length of the folds serving as a means to offset adjacent cylindrical bends and thereby preclude contact thereof one upon the other when the folds are compressed and resilient members having arms disposed between the folds and cooperatively engaging the cylindrical bends for urging the folds apart.

7. As a new article of manufacture a spring seat having in combination a supporting frame, a skeleton frame secured to the supporting frame and comprising malleable low carbon content metal leaf portions consisting of flat vertically aligned folds of unequal length disposed in zig-zag relation and having cylindrical bends at the ends thereof, the inequality in the length of the folds serving as a means to offset adjacent cylindrical bends and thereby preclude contact thereof one upon the other when the folds are compressed and resilient members having arms disposed between the folds and cooperatively engaging the cylindrical bends for urging the folds apart.

8. As a new article of manufacture a spring seat having in combination a supporting frame, a skeleton frame of malleable low carbon content metal secured to the supporting frame, said skeleton frame comprising flat leaf portions, the leaf portions consisting of vertically aligned folds disposed in zig-zag relation, resilient members between the folds for urging the folds apart, and cooperative means on the resilient members and the skeleton frame for precluding lateral and longitudinal movement of the resilient members relative to the skeleton frame.

9. As a new article of manufacture a seat having in combination a supporting frame, a series of spaced skeleton frames secured to the supporting frame, said skeleton frame comprising leaf portions consisting of a plurality of folds yieldingly urged apart, a constricted cylindrical portion connecting leaf portions, and a secondary relatively movable frame attached to one of the cylindrical portions of each leaf portion for supporting and spacing said leaf portions one from the other.

In testimony whereof, we have hereunto subscribed our names this 20th day of March, 1930.

WILLIAM A. MURRAY, Sr.
WILLIAM A. MURRAY, Jr.

CERTIFICATE OF CORRECTION.

Patent No. 1,893,001.   January 3, 1933.

ADOLF ROHRBACH.

It is hereby certified that error appears in the printed specification of the above numbered patent requiring correction as follows: Page 2, line 82, claim 3, strike out the word "edge" and insert the same after "wing" in line 80; and that the said Letters Patent should be read with this correction therein that the same may conform to the record of the case in the Patent Office.

Signed and sealed this 28th day of February, A. D. 1933.

(Seal)

M. J. Moore,
Acting Commissioner of Patents.